(12) United States Patent
Bodine et al.

(10) Patent No.: US 10,373,770 B2
(45) Date of Patent: *Aug. 6, 2019

(54) LAUNDRY TREATING APPLIANCE AND METHOD OF OPERATION FOR A LAUNDRY TREATING APPLIANCE

(71) Applicant: WHIRLPOOL CORPORATION, Benton Harbor, MI (US)

(72) Inventors: Darryl C. Bodine, Saint Joseph, MI (US); Donald E. Erickson, Stevensville, MI (US); Michelle K. Flachs, Saint Joseph, MI (US); Terry K. Litaker, Watervliet, MI (US); Chris W. Paraskevopoulos, Sterling, VA (US); Scott Albright, Buchanan, MI (US); Robert Blake, Three Oaks, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/262,572

(22) Filed: Sep. 12, 2016

(65) Prior Publication Data

US 2016/0376743 A1    Dec. 29, 2016

Related U.S. Application Data

(63) Continuation of application No. 13/927,148, filed on Jun. 26, 2013, now Pat. No. 9,466,439.

(51) Int. Cl.
*H01H 3/16* (2006.01)
*A47L 15/42* (2006.01)
(Continued)

(52) U.S. Cl.
CPC ......... *H01H 3/161* (2013.01); *A47L 15/4257* (2013.01); *A47L 15/4293* (2013.01);
(Continued)

(58) Field of Classification Search
CPC ............ D06F 2214/00; D06F 2216/00; D06F 2224/00; D06F 2232/00; D06F 37/42;
(Continued)

(56) References Cited

U.S. PATENT DOCUMENTS 5,221,360 A    6/1993    Thompson et al.
5,838,125 A    11/1998    Choi
(Continued)

FOREIGN PATENT DOCUMENTS

EP    1650339 A1    4/2006
EP    1650342 A1    4/2006
(Continued)

OTHER PUBLICATIONS

European Search Report for Corresponding EP14173294.1, dated November 27, 2014.

*Primary Examiner* — Crystal J Barnes-Bullock
(74) *Attorney, Agent, or Firm* — McGarry Bair PC (57) ABSTRACT

A laundry treating appliance having at least one automatic cycle of operation, a plurality of components selectively operable by a controller to implement the at least one cycle of operation on a load of laundry received within a treating chamber of the appliance with the controller having a user interface for receiving input from a user and a door for closing an open face of the treating chamber.

17 Claims, 6 Drawing Sheets

(51) Int. Cl.

| | |
|---|---|
| *D06F 58/28* | (2006.01) |
| *D06F 39/14* | (2006.01) |
| *D06F 33/02* | (2006.01) |
| *D06F 37/28* | (2006.01) |
| *D06F 39/00* | (2006.01) |
| *G05B 15/02* | (2006.01) |
| *D06F 37/04* | (2006.01) |
| *D06F 37/38* | (2006.01) |
| *D06F 39/04* | (2006.01) |
| *D06F 39/08* | (2006.01) |

(52) U.S. Cl.
CPC .............. *D06F 33/02* (2013.01); *D06F 37/04* (2013.01); *D06F 37/28* (2013.01); *D06F 37/38* (2013.01); *D06F 39/005* (2013.01); *D06F 39/008* (2013.01); *D06F 39/045* (2013.01); *D06F 39/083* (2013.01); *D06F 39/087* (2013.01); *D06F 39/14* (2013.01); *D06F 58/28* (2013.01); *G05B 15/02* (2013.01); *D06F 2210/00* (2013.01); *D06F 2216/00* (2013.01); *D06F 2224/00* (2013.01); *G05B 2219/2633* (2013.01)

(58) Field of Classification Search
CPC ........ D06F 58/28; D06F 37/28; D06F 39/005; D06F 39/14; A47L 15/4293; A47L 15/4257; A47L 15/4259; A47L 2501/22; F25D 2400/08; F25D 29/00; G05B 2219/2633; H01H 3/161
See application file for complete search history.

(56) References Cited

U.S. PATENT DOCUMENTS

| | | | |
|---|---|---|---|
| 6,786,058 B2 | 9/2004 | Sanna | |
| 6,928,745 B2 | 8/2005 | Lickiss et al. | |
| 7,928,857 B2 | 4/2011 | Olesen et al. | |
| 8,826,701 B2 | 9/2014 | Hong et al. | |
| 9,388,523 B2* | 7/2016 | Han | D06F 39/14 |
| 9,631,312 B2* | 4/2017 | Han | D06F 39/14 |
| 9,916,697 B2* | 3/2018 | Sutton | G07C 1/02 |
| 10,001,282 B2* | 6/2018 | Ozbek | D06F 37/28 |
| 10,105,032 B2* | 10/2018 | Wilson | A47L 15/4257 |
| 2005/0134157 A1 | 6/2005 | Hwang et al. | |
| 2007/0180869 A1 | 8/2007 | Geyer | |
| 2009/0121970 A1 | 5/2009 | Ozbek | |
| 2011/0041260 A1 | 2/2011 | Balinski et al. | |
| 2011/0265271 A1 | 11/2011 | Kim et al. | |
| 2012/0036900 A1 | 2/2012 | Hong et al. | |
| 2012/0194348 A1 | 8/2012 | Hering et al. | |
| 2013/0047677 A1* | 2/2013 | Han | D06F 39/14 68/27 |
| 2013/0047680 A1* | 2/2013 | Han | D06F 39/14 68/5 C |
| 2014/0015814 A1 | 1/2014 | Santana et al. | |
| 2015/0152584 A1 | 6/2015 | Gasparini et al. | |
| 2015/0354125 A1* | 12/2015 | Han | D06F 39/14 68/17 R |

FOREIGN PATENT DOCUMENTS

| | | |
|---|---|---|
| EP | 1935313 A1 | 6/2008 |
| WO | 2012027072 A1 | 3/2012 |

* cited by examiner

LAUNDRY TREATING APPLIANCE AND METHOD OF OPERATION FOR A LAUNDRY TREATING APPLIANCE

CROSS-REFERENCE TO RELATED APPLICATIONS

This application is a continuation of U.S. patent application Ser. No. 13/927,148, filed Jun. 26, 2013, now U.S. Pat. No. 9,466,439, issued Oct. 11, 2016, now which is incorporated herein by reference in its entirety.

BACKGROUND

Laundry treating appliances, such as clothes washers, clothes dryers, refreshers, and non-aqueous systems, may have a configuration based on a rotating drum that defines a treating chamber in which laundry items are placed for treating according to one or more cycles of operation. The laundry treating appliance may have a controller that implements the cycles of operation. The controller may control a user interface to communicate with a user.

BRIEF SUMMARY

In one aspect, the invention relates to a laundry treating appliance for treating laundry in accordance with a treating cycle of operation, including a treating chamber having an open face, a door moveable between an open position and a closed position where the door selectively closes the open face of the treating chamber and having an outer panel, a user interface located on the outer panel of the door and where the user interface is configured to communicate with a user of the laundry treating appliance, and a controller for controlling operation of the laundry treating appliance and wherein the controller is configured to determine the position of the door and operate the user interface based on the determined position In another aspect, the invention relates to a laundry treating appliance for treating laundry in accordance with a treating cycle of operation including a treating chamber having an open face, a door moveable between an open position and a closed position where the door selectively closes the open face of the treating chamber and having an outer panel, a user interface located on the outer panel of the door and where the user interface is configured to communicate with a user of the laundry treating appliance, and a controller for controlling operation of the laundry treating appliance and wherein the controller is configured to determine the position of the door and configured to activate the user interface when the door is determined to be in a closed position.

In yet another aspect, the invention relates to a laundry treating appliance for treating laundry in accordance with a treating cycle of operation including a chassis defining an interior, a treating chamber located within the interior and having an open face, a door for selectively closing the open face of the treating chamber and having a front face, a user interface located on the front face of the door and configured for communicating with a user of the laundry treating appliance, and a controller for controlling operation of the user interface.

DESCRIPTION OF EMBODIMENTS OF THE INVENTION

Figure 1:
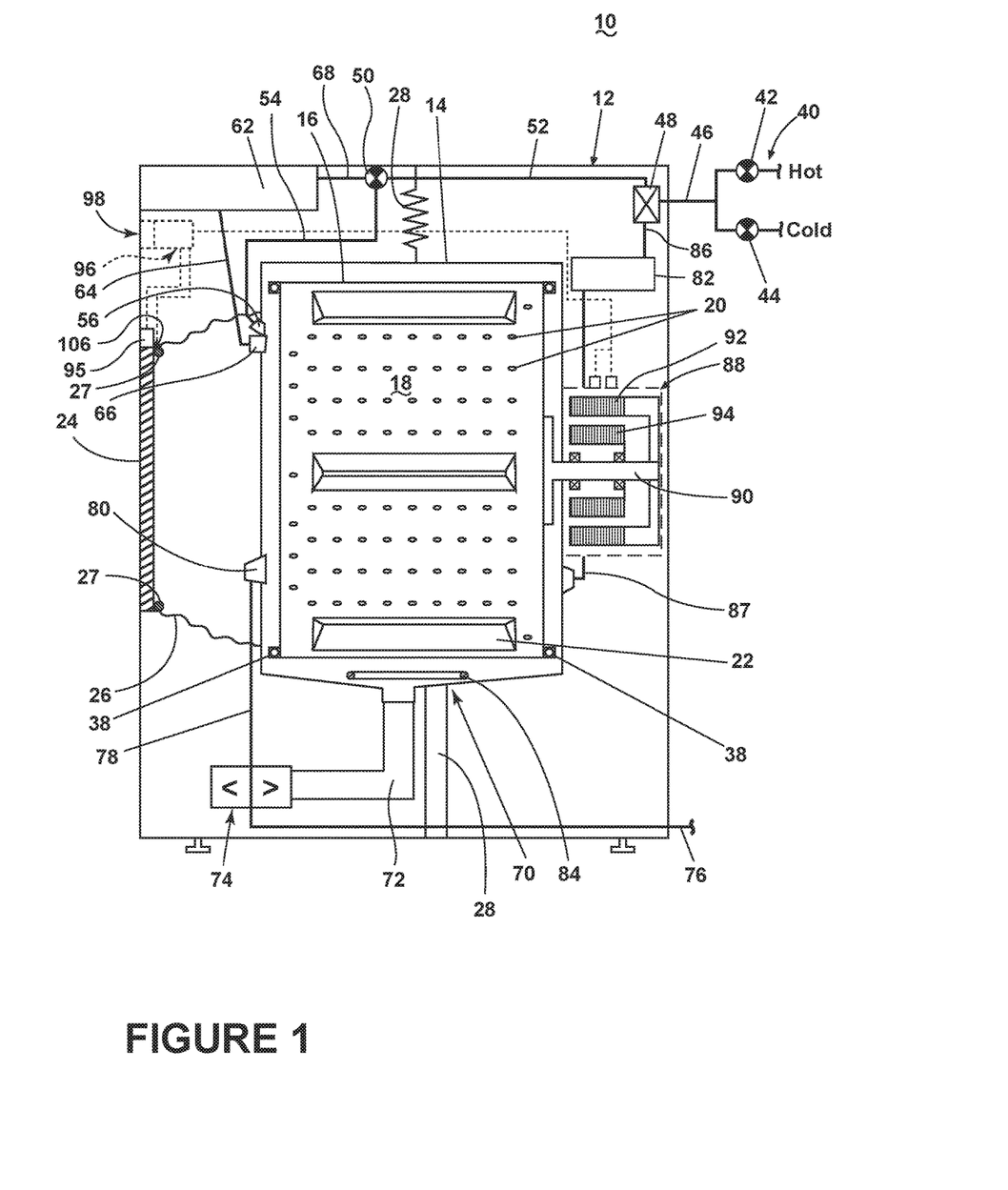
FIG. 1 is a schematic view of a laundry treating appliance in the form of a washing machine according to a first embodiment of the invention.

FIG. 1 is a schematic view of a laundry treating appliance according to a first embodiment of the invention. The laundry treating appliance may be any appliance which performs a cycle of operation to clean or otherwise treat items placed therein, non-limiting examples of which include a horizontal or vertical axis clothes washer; a clothes dryer; a combination washing machine and dryer; a dispensing dryer; a tumbling or stationary refreshing/revitalizing machine; an extractor; a non-aqueous washing apparatus; and a revitalizing machine.

As used herein, the term "vertical-axis" washing machine refers to a washing machine having a rotatable drum that rotates about a generally vertical axis relative to a surface that supports the washing machine. However, the rotational axis need not be perfectly vertical to the surface. The drum may rotate about an axis inclined relative to the vertical axis, with fifteen degrees of inclination being one example of the inclination. Similar to the vertical axis washing machine, the term "horizontal-axis" washing machine refers to a washing machine having a rotatable drum that rotates about a generally horizontal axis relative to a surface that supports the washing machine. The drum may rotate about the axis inclined relative to the horizontal axis, with fifteen degrees of inclination being one example of the inclination.

The laundry treating appliance of FIG. 1 is illustrated as a horizontal-axis washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system includes a tub 14 supported within the cabinet 12 by a suitable suspension system and a drum 16 provided within the tub 14, the drum 16 defining at least a portion of a laundry treating chamber 18 for receiving a laundry load for treatment. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It may also be within the scope of the invention for the laundry holding system to include only a tub with the tub defining the laundry treating chamber.

The laundry treating chamber 18 may have an open face that may be selectively closed by a door 24. More specifically, the door 24 may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14. An optional seal 27 may be included and in such an instance the door 24 may seal against the seal 27 when the door 24 may be closed.

The washing machine 10 may further include a suspension system 28 for dynamically suspending the laundry holding system within the structural support system.

The washing machine 10 may also include at least one balance ring 38 containing a balancing material moveable within the balance ring 38 to counterbalance an imbalance that may be caused by laundry in the treating chamber 18 during rotation of the drum 16. More specifically, the balance ring 38 may be coupled with the rotating drum 16 and configured to compensate for a dynamic imbalance during rotation of the rotatable drum 16. The balancing material may be in the form of balls, fluid, or a combination thereof. The balance ring 38 may extend circumferentially around a periphery of the drum 16 and may be located at any desired location along an axis of rotation of the drum 16. When multiple balance rings 38 are present, they may be equally spaced along the axis of rotation of the drum 16. For example, in the illustrated example a plurality of balance rings 38 are included in the washing machine 10 and the plurality of balance rings 38 are operably coupled with opposite ends of the rotatable drum 16.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and bulk dispenser.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88 for rotationally driving the drum 16. The motor 88 may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled with the drum 16 through a belt and a drive shaft to rotate the drum 16, as may be known in the art. Other motors, such as an induction motor or a permanent split capacitor (PSC) motor, may also be used. The motor 88 may rotationally drive the drum 16 including that the motor 88 may rotate the drum 16 at various speeds in either rotational direction.

An actuator 95 may be operably coupled with the door 24. The actuator 95 may be configured to automatically move the door 24. For example, the actuator 95 may move the door 24 towards a closed position of the door 24. This may include that the actuator 95 may close the door 24. It may also be contemplated that the actuator 95 may be configured to move the door 24 towards an open position. The actuator 95 may move the door 24 in response to user input or input from a control system of the washing machine 10. The actuator 95 may be any suitable type of actuator 95 operably coupled with the door 24 to move the door 24 including that the actuator 95 may include a motor operably coupled with the door 24 or a biasing device, such as a spring. While the actuator 95 has been shown being positioned above the door 24, it will be understood that the actuator 95 may be located in any suitable location.

The control system may control the operation of the washing machine 10 to implement one or more cycles of operation. The control system may include a controller 96 located within the cabinet 12 and a user interface 98 that may be operably coupled with the controller 96. The user interface 98 may include one or more knobs, dials, switches, displays, touch screens, and the like for communicating with the user, such as to receive input and provide output. The user may enter different types of information including, without limitation, cycle selection and cycle parameters, such as cycle options. Furthermore, other user inputs that are separate from the user interface 98 may be included. For example, a button 99 may be included and may be operably coupled with the actuator 95 and the controller 96 to prompt operation of the actuator 95 upon a user selecting the button 99.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It may be contemplated that the controller may be a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
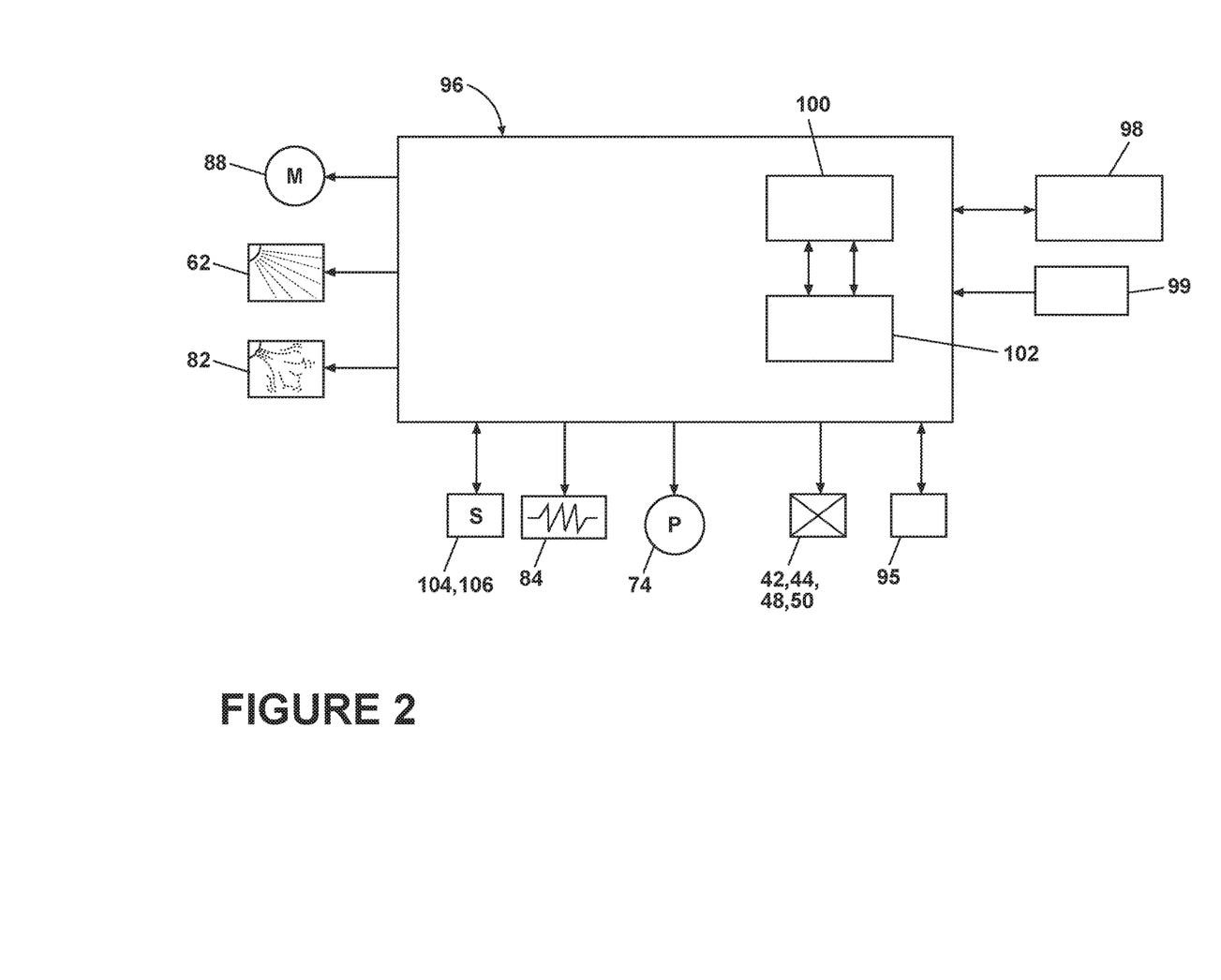
FIG. 2 is a schematic of a control system of the laundry treating appliance of FIG. 1 according to the first embodiment of the invention.

As illustrated in FIG. 2, the controller 96 may be provided with a memory 100 and a central processing unit (CPU) 102. The memory 100 may be used for storing the control software that may be executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor, an imbalance sensor, a load size sensor, and a motor torque sensor, which may be used to determine a variety of system and laundry characteristics, such as laundry load inertia or mass.

In one example, a sensor such as a door position sensor 106 may also be included in the washing machine 10 and may provide a signal to the controller 96 regarding a position of the door. The sensor 106 may be configured to provide any suitable signal to the controller 96 including that the signal may be regarding a change in position of the door 24 within a predetermined range of positions. For example, the sensor 106 may be configured to provide a signal when the door 24 may be moving towards a closed position or may be in a closed position. Further, the position or movement of the door 24 may be determined based on operation of the actuator 95. The controller 96 may use the signal output from the sensor 106 and/or the operation of the actuator 95 to determine movement of the door 24 in a closing direction and may actuate the user interface 98 when it may be determined the door 24 is moved in the closing direction.

Figure 3:
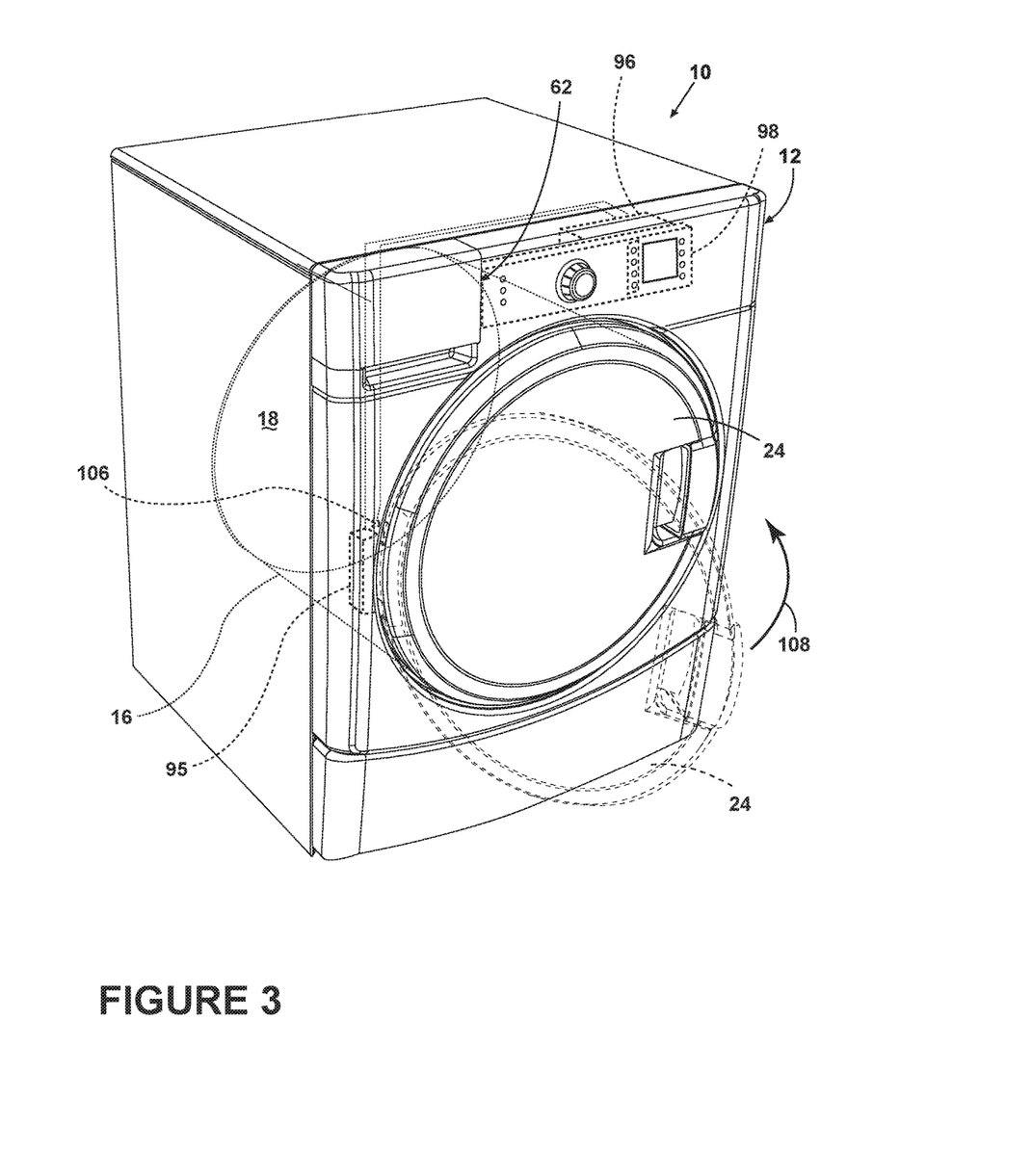
FIG. 3 schematically illustrates a door of the laundry treating appliance of FIG. 1 moving in a closed direction.

FIG. 3 illustrates the door 24 in two positions. The door has been illustrated as being in an open position, shown in phantom, and a closed position. The door moves in a pivoting manner to close the open face. The arrow 108 indicates the direction the door 24 moves when it moves in a closed direction. While the door 24 has been illustrated as pivoting horizontally it may be contemplated that the door 24 may be configured to pivot vertically.

Figure 4:
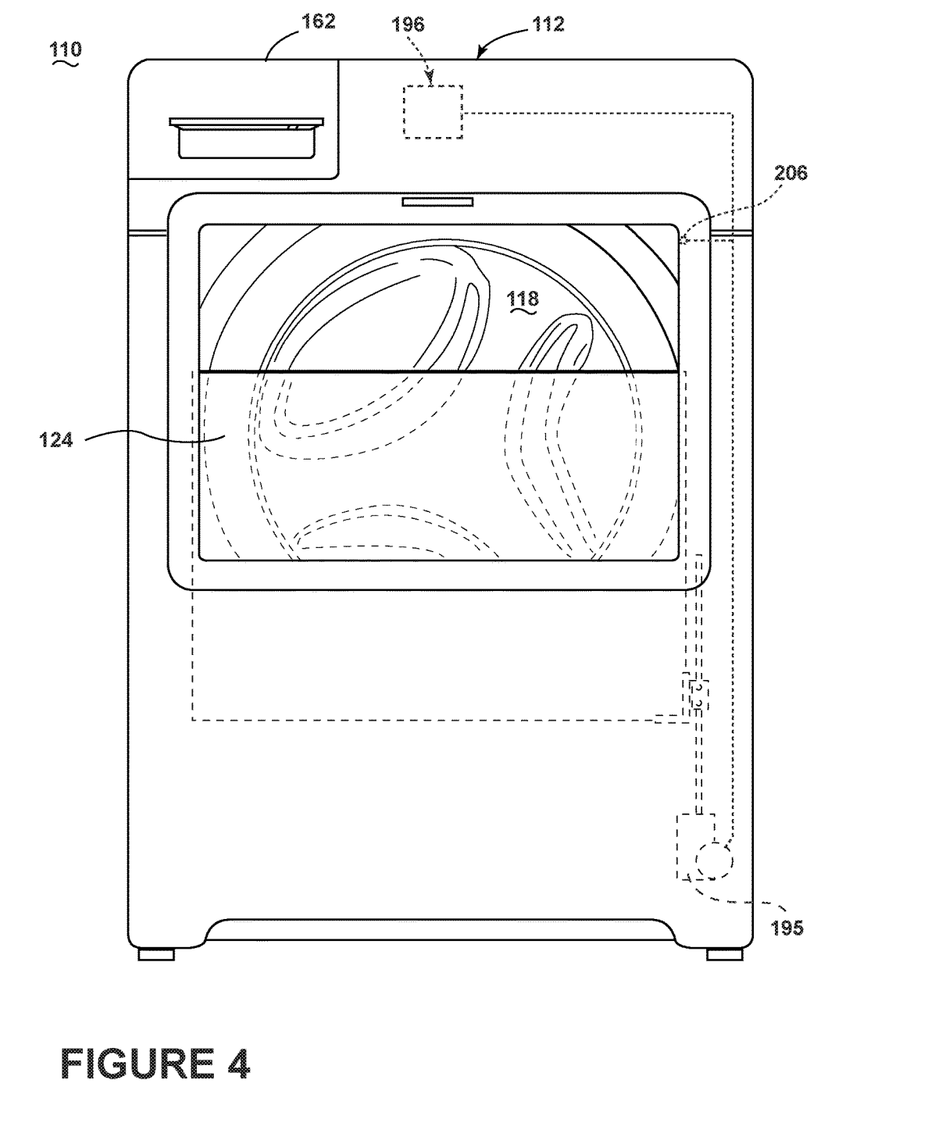
FIGS. 4 and 5 illustrate front views of an alternative washing machine having a sliding door in an open position and a closed position.
Figure 5:
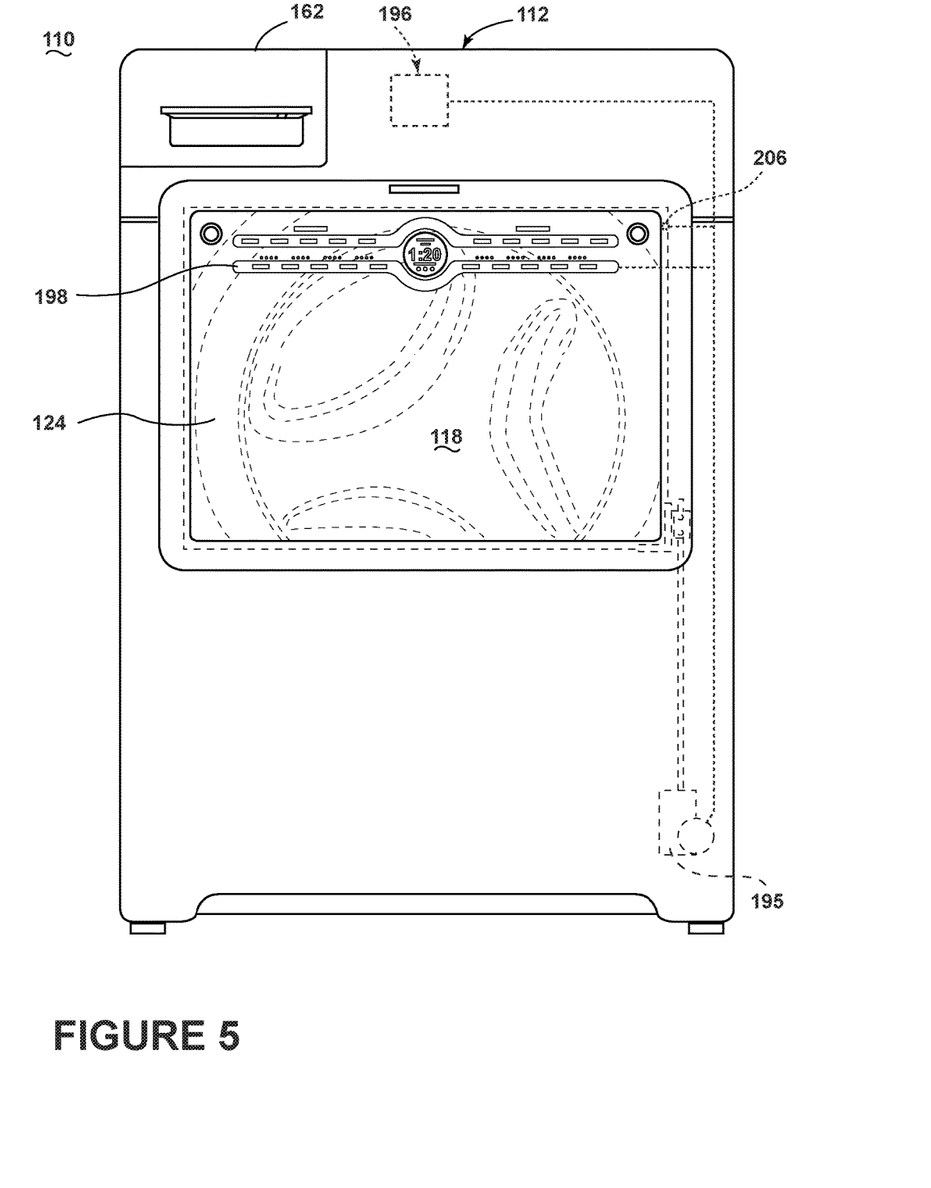

FIGS. 4 and 5 illustrate front views of an alternative washing machine 110 having a sliding door 124. The washing machine 110 is similar to the washing machine 10 previously described and therefore, like parts will be identified with like numerals increased by 100, with it being understood that the description of the like parts of the washing machine 10 applies to the washing machine 110, unless otherwise noted.

One difference is that instead of having a door that opens and closes in a pivoting manner, the door 124 moves in a sliding manner to open and close the open face to the treating chamber 118. For example, FIG. 4 illustrates the door 124 in a partially open position and FIG. 5 illustrates the door 124 in a closed position. The sliding door 124 may be implemented in any suitable manner including that an actuator 195 may be included to move the sliding door 124 between open and closed positions or that the door 124 may be manually moved. In the illustrated example the sliding door 124 includes a see through panel or window 125. It is contemplated that the sliding door may include multiple sliding panels including an outer panel that may be configured to protect the user from the motion of the drum 116 and an inner panel that seals the treating chamber 118.

As best seen in FIG. 5, another difference is that the user interface 198 may be located on the window 125 of the door 124. As may be seen in the illustrated example, the user interface has been illustrated as being neither active nor visible when the door 124 is in the open or partially open position and has been illustrated as being visible and active when the door 124 may be in the closed position. Similarly to the earlier embodiment a door position sensor 206 may also be included in the washing machine 110 and may provide a signal to the controller 196 regarding when the door 124 may be moving towards a closed position or may be in a closed position. Further, the position or movement of the door 124 may be determined based on operation of the actuator 195. The controller 196 may use the signal output from the sensor 206 and/or the operation of the actuator 195 to determine movement of the door 124 in a closing direction and may actuate the user interface 198 when it may be determined the door 124 is moved in the closing direction. This may include illuminating the portion the user interface 198 on the window 125 of the door 124.

Figure 6:
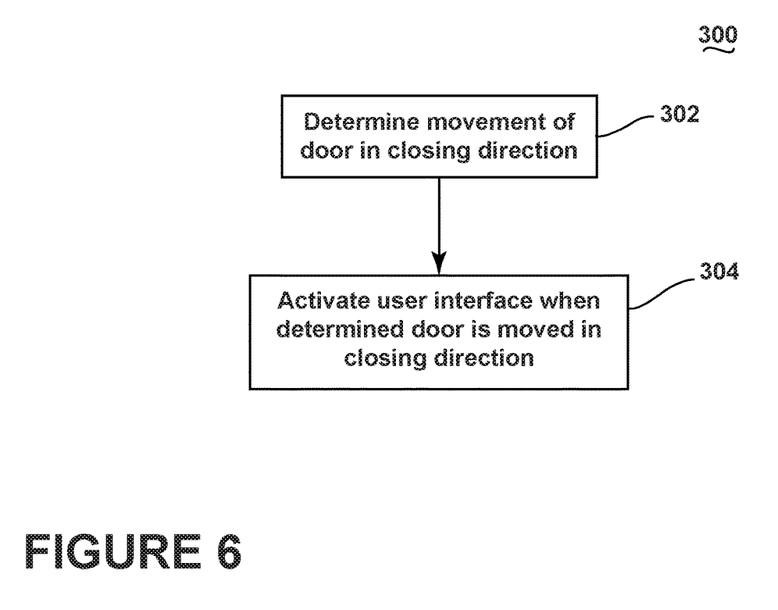
FIG. 6 illustrates a flow chart of a method for operating a laundry treating appliance, such as the washing machines of FIGS. 1 and 4.

Referring now to FIG. 6, a flow chart of a method 300 for operating a laundry treating appliance, such as the washing machine 10 or the washing machine 110, is illustrated. The sequence of steps depicted for this method is for illustrative purposes only, and is not meant to limit the method in any way as it is understood that the steps may proceed in a different logical order or additional or intervening steps may be included without detracting from the invention. The method 300 may be implemented in any suitable manner, such as automatically or manually, as a stand-alone phase or cycle of operation or as a phase of an operation cycle of the washing machine 10 or the washing machine 110. While the method 300 may be utilized with either of the washing machines 10 and 110, the method 300 will be described with respect to the washing machine 10 for ease of explanation.

At 302, the controller 96 may determine a movement of the door 24 in a closing direction. For example, the controller 96 may determine that the door 24 is moving towards the open face of the treating chamber 18. This may include determining that the door 24 may be moving within a predetermined range of motion towards the open face of the treating chamber 18. This may also include determining the door 24 may be in a closed position or a nearly closed position. For example, the controller 96 may determine that the door 24 may be adjacent the seal 27. The controller 96 may use the signal output from the sensor 106 and/or the operation of the actuator 95 to determine movement of the door 24 in a closing direction and at 304 may actuate the user interface 98 when it may be determined the door 24 is moved in the closing direction.

Actuating the user interface 98 may be done in any suitable manner including that the user interface 98 may be actuated by the controller 96 providing power to the user interface 98. Actuating the user interface 98 may alternatively or additionally include the controller 96 illuminating a portion of the user interface 98 including illuminating the entire user interface 98. For example, where the user interface 98 includes a plurality of lights, the controller 96 may illuminate at least some of the plurality of lights when it may be determined the door 24 is moving in the closing direction. Actuating the user interface 98 may alternatively or additionally include activating the user interface 98 so it may be responsive to user inputs. For example, in the case where the user interface 98 includes a circuit board having a plurality of switches that are accessible to the user, the controller 96 may activate the switches when it may be determined the door 124 is moving in the closing direction.

It will be understood that the method of operating the laundry treating appliance may be flexible and that the method 300 illustrated is merely for illustrative purposes. For example, it is contemplated that the controller 96 may automatically move the door towards a closed position of the door. This may include sliding the door towards the closed position of the door or pivoting the door towards the closed position of the door. The moving the door towards a closed position may be in response to a user initiated stimulus.

The above described embodiments provided a variety of benefits including that the user interface may be activated when the door may be closed or may be moving towards a closed position. Some contemporary home appliances have user interfaces that are active when the door is opened, such as a dishwasher. Conversely, the above described embodiments include that the user interface may be inactive when the door may be partially open but actuated when the door may be in a closed position or moving towards a closed position. The door does not need to be locked for the user interface to be actuated. This provides additional safety as the cycle of operation of the laundry treating appliance may not be started when the door is open as the user interface may be inactive. Further, the above described embodiments may result in reduced standby power usage as the user interface may be inactive until the door is closed or is moving towards a closed position.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. Further, while the above described embodiments have been described with respect to clothes washing machines the embodiments of the invention may be implemented in any suitable laundry treating appliance.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A laundry treating appliance for treating laundry in accordance with a treating cycle of operation, comprising:
   a treating chamber having an opened face;
   a door moveable between an opened position and a closed position where the door selectively closes the open face of the treating chamber and having an outer panel;
   a user interface located on the outer panel of the door and where the user interface is configured to communicate with a user of the laundry treating appliance including that the user interface is configured to receive user input and provide output; and
   a controller for controlling operation of the laundry treating appliance and wherein the controller is configured to determine a position of the door to define a determined position and operate the user interface based on the determined position and wherein the controller is configured to operate the user interface such that the user interface is invisible and inactive when the door is determined to be in the opened position or a partially opened position and the user interface is visible and active when the door is determined to be in the closed position.

2. The laundry treating appliance of claim 1, further comprising a sensor operably coupled with the controller and providing a signal to the controller related to a position of the door.

3. The laundry treating appliance of claim 1 wherein the user interface comprises a circuit board having a plurality of switches that are accessible to the user and the controller activates the switches when the door is determined to be in the closed position.

4. The laundry treating appliance of claim 1 wherein the user interface comprises a plurality of lights and where the controller illuminates at least some of the plurality of lights when the door is determined to be in the closed position.

5. The laundry treating appliance of claim 1 wherein the door further includes a window and the user interface is located on the window of the door.

6. A laundry treating appliance for treating laundry in accordance with a treating cycle of operation, comprising:
   a treating chamber having an opened face;
   a door moveable between an opened position and a closed position where the door selectively closes the opened face of the treating chamber and having an outer panel located within a frame;
   a user interface located on the outer panel of the door and where the user interface is configured to communicate with a user of the laundry treating appliance including that the user interface is configured to receive user input and provide output;
   an actuator operably coupled with the door to move the door; and
   a controller for controlling operation of the laundry treating appliance and wherein the controller is configured to determine a position or movement of the door based on the actuator and configured to activate the user interface when the door is determined to be in the closed position or moving towards the closed position.

7. The laundry treating appliance of claim 6, further comprising a sensor operably coupled with the controller and providing a signal to the controller regarding a position of the door.

8. The laundry treating appliance of claim 6 wherein the user interface comprises a circuit board having a plurality of switches that are accessible to the user and the controller activates the switches when the door is determined to be in the closed position.

9. The laundry treating appliance of claim 6 wherein the user interface comprises a plurality of lights and where the controller illuminates at least some of the plurality of lights to activate the user interface when the door is determined to be in the closed position.

10. The laundry treating appliance of claim 6 wherein the outer panel further includes a window and the user interface is located on the window.

11. A laundry treating appliance for treating laundry in accordance with a treating cycle of operation, comprising:
    a chassis defining an interior;
    a treating chamber located within the interior and having an opened face;
    a door for selectively closing the opened face of the treating chamber and having a front face forming an outer window;
    a user interface located on the outer window of the front face of the door and configured for communicating with a user of the laundry treating appliance including that the user interface is configured to receive user input and provide output; and
    a controller for controlling operation of the user interface.

12. The laundry treating appliance of claim 11 wherein the door is pivotally mounted to the chassis between an opened position and a closed position where the door closes the opened face.

13. The laundry treating appliance of claim 11 wherein the user interface is operated by the controller to be inactive when the door is in an opened position or a partially open position.

14. The laundry treating appliance of claim 13 wherein the user interface is operated by the controller to be active when the door is in a closed position.

15. The laundry treating appliance of claim 11 wherein the user interface is not visible when the door is in an opened position or a partially open position.

16. The laundry treating appliance of claim 15 wherein the user interface is visible and active when the door is in a closed position.

17. The laundry treating appliance of claim 11 wherein the door further includes an inner panel that seals the treating chamber.

* * * * *